United States Patent [19]

Muchel

[11] Patent Number: 5,032,011
[45] Date of Patent: Jul. 16, 1991

[54] TRANSMITTED-LIGHT ILLUMINATING ARRANGEMENT FOR A MICROSCOPE

[75] Inventor: Franz Muchel, Königsbronn, Fed. Rep. of Germany

[73] Assignee: Carl-Zeiss-Stiftung, Heidenheim, Fed. Rep. of Germany

[21] Appl. No.: 513,831

[22] Filed: Apr. 24, 1990

[30] Foreign Application Priority Data

Apr. 29, 1989 [DE] Fed. Rep. of Germany ....... 3914274

[51] Int. Cl.⁵ .......................... G02B 21/08; G02B 7/02
[52] U.S. Cl. ..................... 350/416; 350/523; 350/526; 350/449; 350/450; 350/252; 350/247
[58] Field of Search ............... 350/523, 525, 526, 528, 350/416, 449, 450, 252, 247

[56] References Cited

U.S. PATENT DOCUMENTS 2,078,586  4/1937  Richter ................................ 350/450
2,351,736  6/1944  Benford ............................... 350/450
3,160,698  12/1964  Frey ..................................... 350/525
4,521,076  6/1985  Weber et al. .

FOREIGN PATENT DOCUMENTS 596683  10/1925  France ................................. 350/416
396325  8/1933  United Kingdom .
717242  10/1954  United Kingdom ................ 350/416
2123973  2/1984  United Kingdom .

Primary Examiner—Jon W. Henry
Attorney, Agent, or Firm—Walter Otteson

[57] ABSTRACT

The invention is directed to a transmitted-light illuminating arrangement having a condenser including one or two lenses. A glass sphere is selected as the front lens for the condenser. The illuminating arrangement permits Köhler illuminating conditions to be set and yet has a simple configuration which can be economically produced.

9 Claims, 2 Drawing Sheets

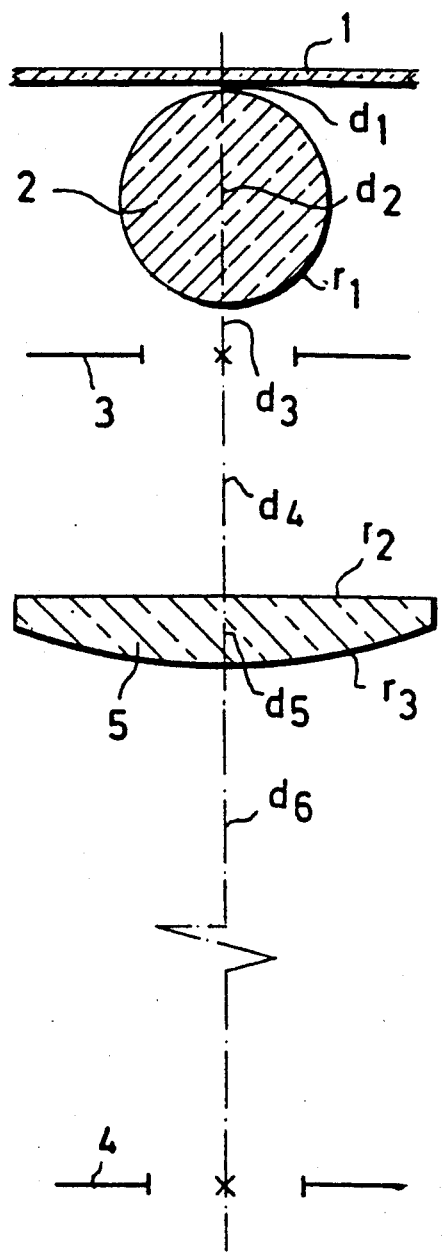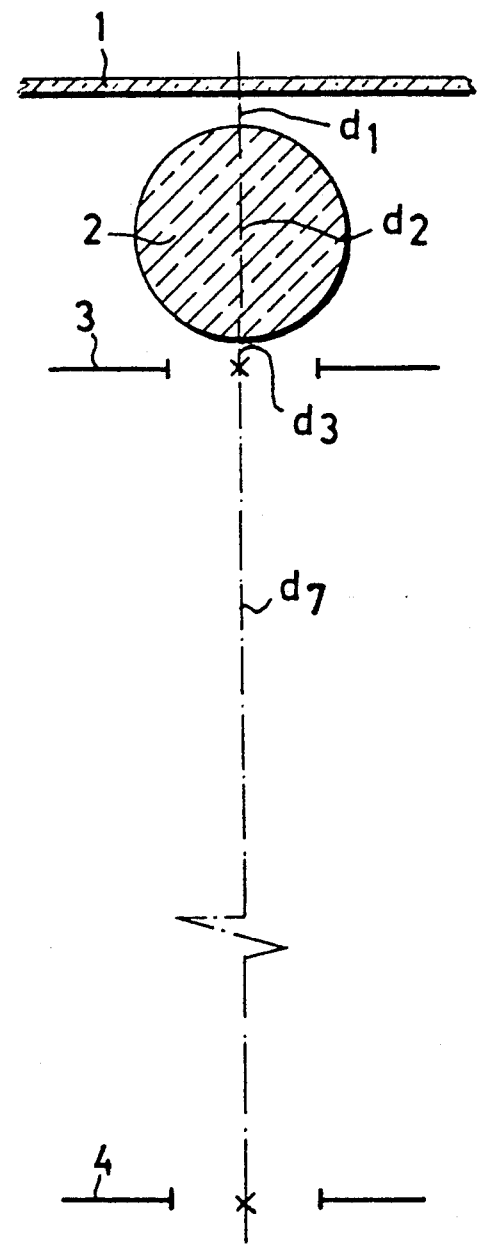

TRANSMITTED-LIGHT ILLUMINATING ARRANGEMENT FOR A MICROSCOPE

BACKGROUND OF THE INVENTION

The illuminating arrangements used in microscopes have a light source and a collector corresponding to the light source as well as a field diaphragm having an adjustable diameter. These illuminating arrangements also have a condenser having two or more lenses and the condenser likewise has an adjustable aperture diaphragm. The adjustable field and aperture diaphragms are necessary in order to set Köhler light conditions.

The condensers known to date of simple configuration, such as those disclosed in U.S. Pat. No. 4,521,076, include a front lens in the form of a plano-convex lens since such lenses are relatively simple to produce. Nevertheless, the tolerance requirements imposed on this element are still costly. On the one hand, the wedge error must be held sufficiently low during the production of this lens. On the other hand, the lens must be well centered in its mount.

British Patent 396,325 discloses an incident illuminating device for microscopes which consists of only an incandescent bulb and a glass sphere. Köhler illuminating conditions cannot be set with this known arrangement since there is neither an adjustable field diaphragm nor an aperture diaphragm provided. Instead, the size of the illuminating field is adjusted by varying the distance between the light source and the glass sphere which leads to a more or less so-called critical illumination for which the light source itself is imaged in the vicinity of the object plane.

Published British patent application GB-A-2 123 973 discloses a specimen holder which includes a glass sphere which functions as a condenser and couples light into the end face of a glass fiber. In this arrangement, neither a field diaphragm nor an aperture diaphragm is provided. Instead, this device is a special construction for testing glass fibers which cannot be utilized for illuminating any desired specimens on a microscope.

SUMMARY OF THE INVENTION

It is an object of the invention to provide a simple transmitted-light illuminating arrangement for a microscope which permits Köhler light conditions to be set with a sufficiently high aperture in the conventional manner and yet has the simplest possible configuration which is inexpensive to manufacture.

The transmitted-light illuminating arrangement of the invention is for a microscope defining an optical axis. The illuminating arrangement includes: an adjustable field diaphragm mounted on the optical axis; a condenser likewise mounted on the optical axis in spaced relationship to the field diaphragm; and, the condenser including a spherical front lens and an aperture diaphragm disposed between the front lens and the field diaphragm.

It is a feature of the invention that the front lens is configured as a full sphere. For this reason, no wedge error can occur having tolerances which would have to be considered. Furthermore, the sphere is self-centering in its mount so that this tolerance in assembly is also avoided. Even with the sphere as a single lens in the condenser, an aperture of 0.45 of the condenser is obtainable which is sufficiently high for most purposes. If higher apertures are required, an additional converging lens can be included such as a plano-convex lens having a long focal length. With this measure, a condenser having an aperture of 0.8 is obtained which is also suitable for phase contrast. In this way, the invention makes possible an economical transmitted-light condenser while at the same time providing a good optical capacity.

BRIEF DESCRIPTION OF THE DRAWINGS

The invention will now be described with reference to the drawings wherein:

FIG. 1 is a schematic of the optics of a condenser according to the invention having two lenses;

FIG. 2 is a schematic of the optics of the condenser with the second lens indexed out of the optical axis; and, FIG. 3 is a section view of an upright microscope taken at a plane which includes the optical axis. The microscope is shown equipped with the condenser of FIG. 1 with its mount built into the microscope.

DESCRIPTION OF THE PREFERRED EMBODIMENTS OF THE INVENTION

Figure 3:
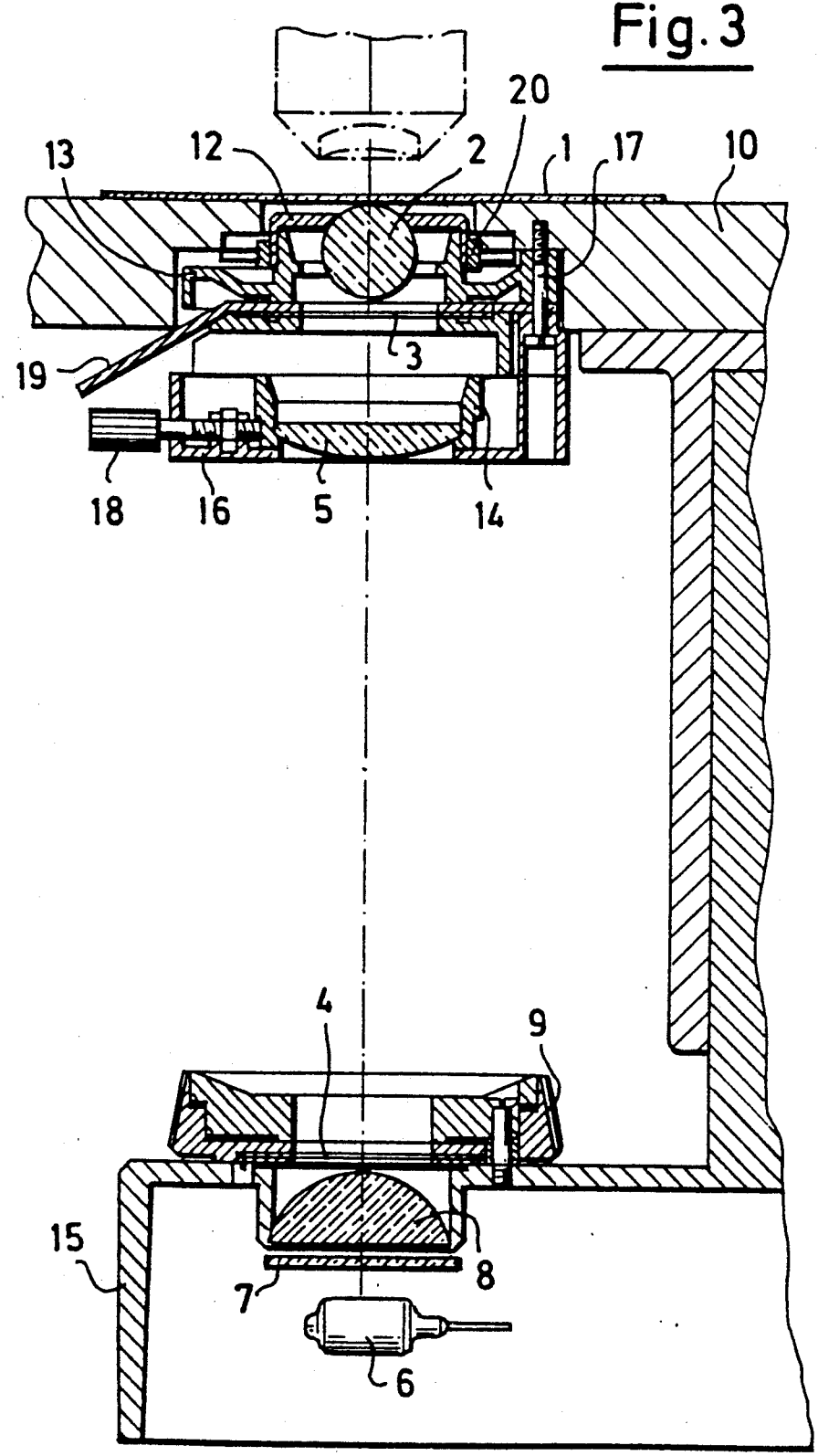

The specimen holder is identified in the drawings by reference numeral 1. The condenser includes a front lens in the form of a glass sphere 2 disposed at a spacing of $d_1$ below the specimen holder 1 to be illuminated. The condenser also includes an aperture diaphragm 3 and a plano-convex lens 5 having a long focal length. The lens 5 is at a spacing of $d_4$ from the aperture diaphragm. The optical data of this condenser are delineated in Table I.

TABLE I

| Radii r/mm | Distances/Thickness d/mm | Glass |
|---|---|---|
| $r_1 = 13.67$ | $d_1 = 0.4$ | |
| | $d_2 = 2r_1$ | $n_{d1} = 1.60738$ $v_{d1} = 56.45$ |
| | $d_3 = 2.0$ | |
| | $d_4 = 16.0$ | |
| $r_2 = \infty$ | | |
| | $d_5 = 4.5$ | $n_{d2} = 1.60738$ $v_{d2} = 56.45$ |
| $r_3 = 30.00$ | | |
| | $d_6 = 100$ | |

Numerical Aperture = 0.8

This condenser has an aperture of 0.8 and is therefore well suited for operating in combination with objectives having a linear magnification of up to 100×. For the purpose of better contrast, the condenser aperture is always adjusted somewhat lower than the objective aperture and is approximately adjusted to ⅔ of the objective aperture.

The mechanical assembly of the complete transmitted-light illuminating arrangement including the condenser and the light source is shown in FIG. 3. Reference numeral 15 identifies the foot and reference numeral 10 identifies the stage plate of the microscope which is otherwise not shown. The incandescent lamp 6 of the illuminating arrangement as well as a collector 8 are disposed in the foot 15. The collector 8 illuminates the opening of the field diaphragm 4 having a diameter adjustable by means of the ring 9. A diffusion plate 7 is interposed between the light source 6 and the collector 8. The diffusion plate 7 homogenizes the luminance in the plane of the field diaphragm 4.

The condenser is mounted with threaded fasteners below the specimen stage 10. The condenser has an adjusting lever 19 for the aperture diaphragm 3 which is likewise adjustable. The front lens 2 is configured as a full sphere and is pressed by the cap 12 against a centering support in the housing 13 of the condenser. During assembly, the spherical front lens 2 is dropped into its mount and the cap 12 is seated on the lens 2. No centering measures of any kind are required.

The second lens 5 is mounted below the aperture diaphragm 3 and is accommodated in a mount 14 which is adjustable perpendicularly to the optical axis by means of set screws. Only one of the two set screws, namely set screw 18, is shown in FIG. 3. The carrier 16 for the adjusting mount 14 is pivotable about a rotational axis offset and parallel to the optical axis so that the lens 5 can be pivoted out of the beam path.

Space is provided between the lens 5 and the aperture diaphragm 3 for accommodating a slider or turret on which phase rings or other contrasting means can be additionally brought into the beam path.

The centering mount for the glass sphere 2 is resiliently configured so that the glass sphere 2 can be lowered with the aid of a lever which is coupled to a threaded ring 20 acting on the cap 12. When the lens 5 is moved out of the beam path and the front lens 2 is lowered, the beam path shown in FIG. 2 is essentially obtained and the aperture and field size are adapted to the objectives having a lower linear magnification. The values for distance and aperture given in Table II apply for a correct adjustment.

TABLE II

| Radius r/mm | Distances d/mm | | Glass | |
|---|---|---|---|---|
| $r_1 = 13.67$ | $d_1 = 2.1$ | | | |
| | $d_2 = 2r_1$ | $n_{d1} = 1.60738$ | $v_{d1} = 56.45$ | |
| | $d_3 = 2.0$ | | | |
| | $d_4 = 119.5$ | | | |

Numerical Aperture = 0.45

It is understood that the foregoing description is that of the preferred embodiments of the invention and that various changes and modifications may be made thereto without departing from the spirit and scope of the invention as defined in the appended claims.

What is claimed is:

1. A transmitted-light illuminating arrangement for a microscope defining an optical axis, the illuminating arrangement comprising:
   an adjustable field diaphragm mounted on said optical axis;
   a condenser likewise mounted on said optical axis in spaced relationship to said field diaphragm; and,
   the condenser including a spherical front lens and an aperture diaphragm disposed between said front lens and said field diaphragm.

2. The transmitted-light illuminating arrangement of claim 1, said condenser including a second lens arranged on said optical axis, and said second lens being a convergent lens having a long focal length.

3. The transmitted-light illuminating arrangement of claim 2, further comprising means for moving said second lens out of said optical axis.

4. The transmitted-light illuminating arrangement of claim 1, wherein said microscope has a specimen stage, and wherein said spherical front lens has a radius $r_1$ and a thickness $d_2$; said front lens being disposed a distance $d_1$ from said specimen stage; and, said aperture diaphragm being disposed a distance $d_3$ from said front lens and a distance $d_7$ from said field diaphragm; said front lens having an index of refraction $n_{d1}$ and a dispersion $v_{d1}$; and, wherein:
   $r_1 = 13.67$ mm
   $d_1 = 2.1$ mm
   $d_2 = 2r_1$
   $d_3 = 2.0$ mm
   $d_7 = 119.5$ mm
   $n_{d1} = 1.60738$
   $v_{d1} = 56.45$.

5. The transmitted-light illuminating arrangement of claim 4, wherein said condenser has a numerical aperture = 0.45.

6. The transmitted-light illuminating arrangement of claim 1, wherein said microscope has a specimen stage, and wherein said spherical front lens has a radium $r_1$ and a thickness $d_2$; said front lens being disposed a distance $d_1$ from said specimen stage; and, said aperture diaphragm being disposed a distance $d_3$ from said front lens and a distance $d_7$ from said field diaphragm; said front lens having an index of refraction $n_{d1}$ and a dispersion $v_{d1}$; and, wherein the parameters $r_1$, $d_1$, $d_2$, $d_3$, $d_7$, $n_{d1}$ and $v_{d1}$ are selected so as to cause said condenser to have a numerical aperture of approximately 0.45.

7. A transmitted-light illuminating arrangement for a microscope defining an optical axis and having a specimen stage, the illuminating arrangement comprising:
   an adjustable field diaphragm mounted on said optical axis;
   a condenser likewise mounted on said axis in spaced relationship to said field diaphragm;
   said condenser including: a spherical front lens having a radius $r_1$ and a thickness $d_2$ and being disposed a distance $d_1$ from said specimen stage; and, an aperture diaphragm disposed on said optical axis a distance $d_3$ away from said front lens;
   said front lens having an index of refraction $n_{d1}$ and a dispersion $v_{d1}$;
   said condenser further including a convergent lens having a thickness $d_5$ and being disposed on said axis between said aperture diaphragm and said field diaphragm so a to be a distance $d_4$ from said aperture diaphragm and a distance $d_6$ from said field diaphragm;
   said convergent lens having a first surface defining a radium $r_2$ and a second surface defining a radius $f_3$; and, said convergent lens having an index of refraction $n_{d2}$ and a dispersion $v_{d2}$; and,
wherein
   $r_1 = 13.67$ mm
   $r_2 = \infty$
   $r_3 = 30.0$ mm
   $d_1 = 0.4$ mm
   $d_2 = 2r_1$
   $d_3 = 2.0$ mm
   $d_4 = 16.0$ mm
   $d_5 = 4.5$ mm
   $d_6 = 100$ mm
   $n_{d1} = 1.60738$
   $v_{d1} = 56.45$
   $n_{d2} = 1.60738$
   $v_{d2} = 56.45$.

8. The transmitted-light illuminating arrangement of claim 7, wherein said condenser has a numerical aperture = 0.8.

9. A transmitted-light illuminating arrangement for a microscope defining an optical axis and having a specimen stage, the illuminating arrangement comprising:

an adjustable field diaphragm mounted on said optical axis;

a condenser likewise mounted on said axis in spaced relationship to said field diaphragm;

said condenser including: a spherical front lens having a radius $r_1$ and a thickness $d_2$ and being disposed a distance $d_1$ from said specimen stage; and, an aperture diaphragm disposed on said optical axis a distance $d_3$ away from said front lens;

said front lens having an index of refraction $n_{d1}$ and a dispersion $\nu_{d1}$;

said condenser further including a convergent lens having a thickness $d_5$ and being disposed on said axis between said aperture diaphragm and said field diaphragm so as to be a distance $d_4$ from said aperture diaphragm and a distance $d_6$ from said field diaphragm;

said convergent lens having a first surface defining a radius $r_2$ and a second surface defining a radius $r_3$; and, said convergent lens having an index of refraction $n_{d2}$ and a dispersion $\nu_{d2}$; and, wherein the parameters $r_1$, $r_2$, $r_3$, $d_1$ to $d_6$, $n_{d1}$, $\nu_{d1}$, $n_{d2}$ and $\nu_{d2}$ are selected so as to cause said condenser to have a numerical aperture of approximately .8.

* * * * *

UNITED STATES PATENT AND TRADEMARK OFFICE
CERTIFICATE OF CORRECTION

PATENT NO. : 5,032,011

DATED : July 16, 1991

INVENTOR(S) : Franz Muchel

It is certified that error appears in the above-identified patent and that said Letters Patent is hereby corrected as shown below:

On the title page, under Attorney, Agent or Firm, delete "Walter Otteson" and substitute -- Walter Ottesen -- therefor.

In column 4, line 15: delete "radium" and substitute -- radius -- therefor.

In column 4, line 42: delete "a" and substitute -- as -- therefor.

In column 4, line 46: delete "radium" and substitute -- radius -- therefor.

In column 4, line 46: delete "$f_3$" and substitute -- $r_3$ -- therefor.

In column 4, line 49: after "wherein" add -- : --.

Signed and Sealed this

Sixth Day of April, 1993

Attest:

STEPHEN G. KUNIN

Attesting Officer

Acting Commissioner of Patents and Trademarks